(12) United States Patent
Zimmanck et al.

(10) Patent No.: US 10,996,704 B2
(45) Date of Patent: May 4, 2021

(54) METHOD AND APPARATUS FOR CONTROL OF INTELLIGENT LOADS IN MICROGRIDS

(71) Applicant: Enphase Energy, Inc., Petaluma, CA (US)

(72) Inventors: Donald Richard Zimmanck, Petaluma, CA (US); Christopher N. Rowe, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 530 days.

(21) Appl. No.: 15/180,051

(22) Filed: Jun. 12, 2016

(65) Prior Publication Data

US 2016/0363949 A1      Dec. 15, 2016

Related U.S. Application Data

(60) Provisional application No. 62/174,861, filed on Jun. 12, 2015.

(51) Int. Cl.
| | |
|---|---|
| *G05B 13/02* | (2006.01) |
| *G05F 1/66* | (2006.01) |
| *H02J 3/00* | (2006.01) |
| *H02J 3/14* | (2006.01) |
| *H02M 3/04* | (2006.01) |
| *H02M 7/44* | (2006.01) |

(52) U.S. Cl.
CPC ............. *G05F 1/66* (2013.01); *G05B 13/021* (2013.01); *H02J 3/00* (2013.01); *H02J 3/14* (2013.01); *H02M 3/04* (2013.01); *H02M 7/44* (2013.01); *G05B 2219/41246* (2013.01)

(58) Field of Classification Search
CPC ......................... G05B 2219/41246; G05F 1/66
See application file for complete search history.

(56) References Cited

U.S. PATENT DOCUMENTS 6,243,626 B1 *   6/2001  Schanin ................... G07F 9/02
                                                        700/286
6,975,926 B2 * 12/2005  Schanin .................. F25D 29/00
                                                        236/46 R
(Continued)

FOREIGN PATENT DOCUMENTS

EP              2869424 A1      5/2015
WO       WO-2012162646 A1     11/2012
(Continued)

OTHER PUBLICATIONS

PCT International Search Report and Written Opinion dated Sep. 22, 2016 for PCT Application No. PCT/US2016/037115, 13 pgs.
(Continued)

*Primary Examiner* — Jennifer L Norton
(74) *Attorney, Agent, or Firm* — Moser Taboada

(57) ABSTRACT

A method and apparatus for controlling a microgrid load. In one embodiment, the method comprises measuring at least one grid parameter of a microgrid transmission line coupled to a load in a microgrid; computing, using the at least one grid parameter and a droop control technique, at least one virtual set-point; determining a modification to operation of the load based on the at least one virtual set-point; and modifying operation of the load based on the modification.

20 Claims, 6 Drawing Sheets

(56) References Cited

U.S. PATENT DOCUMENTS

| | | | |
|---|---|---|---|
| 2007/0055408 A1* | 3/2007 | Delmerico | H02J 3/06 700/286 |
| 2008/0212343 A1* | 9/2008 | Lasseter | H02J 3/30 363/39 |
| 2009/0240381 A1* | 9/2009 | Lane | H02J 3/14 700/296 |
| 2010/0179708 A1 | 7/2010 | Watson et al. | |
| 2010/0284117 A1* | 11/2010 | Crane | B63H 21/20 361/93.1 |
| 2011/0202181 A1 | 8/2011 | Lee et al. | |
| 2012/0143385 A1* | 6/2012 | Goldsmith | H02J 3/38 700/297 |
| 2012/0215368 A1* | 8/2012 | Sharma | H02J 3/32 700/287 |
| 2012/0283888 A1 | 11/2012 | Mao et al. | |
| 2013/0021829 A1* | 1/2013 | Sao | H02J 3/38 363/71 |
| 2013/0085614 A1* | 4/2013 | Wenzel | G05D 23/1923 700/277 |
| 2013/0342020 A1* | 12/2013 | Blevins | H02J 4/00 307/84 |
| 2014/0021889 A1* | 1/2014 | Gerdes | H02P 25/092 318/254.2 |
| 2014/0097683 A1* | 4/2014 | Piyabongkarn | H02J 3/32 307/26 |
| 2014/0152009 A1* | 6/2014 | Meisner | H02P 9/04 290/7 |
| 2014/0265636 A1* | 9/2014 | De Natale | H03K 5/1252 307/117 |
| 2014/0316592 A1* | 10/2014 | Haj-Maharsi | F03D 7/048 700/287 |
| 2014/0375129 A1* | 12/2014 | Lazar | H02M 3/158 307/36 |
| 2015/0061633 A1* | 3/2015 | Marchand | G06F 1/00 323/299 |
| 2015/0112501 A1 | 4/2015 | Rombouts et al. | |
| 2015/0214754 A1* | 7/2015 | Choi | H02J 7/007 320/134 |
| 2015/0249415 A1* | 9/2015 | Babazadeh | H02P 9/02 290/44 |
| 2016/0241032 A1* | 8/2016 | Zimmanck | G05B 15/02 |
| 2016/0248253 A1 | 8/2016 | Zimmanck | |
| 2016/0313716 A1* | 10/2016 | Chen | H02J 4/00 |
| 2017/0170764 A1* | 6/2017 | Blackwelder | H02P 9/14 |
| 2019/0267806 A1* | 8/2019 | Scott | H02J 3/18 |
| 2020/0110115 A1* | 4/2020 | Baone | G01R 21/1331 |

FOREIGN PATENT DOCUMENTS

| | | | | |
|---|---|---|---|---|
| WO | WO-2013010266 A1 * | 1/2013 | ............. | H02J 3/381 |
| WO | WO-2013098233 A2 | 7/2013 | | |

OTHER PUBLICATIONS

Pogaku et al., "Modeling, Analysis and Testing of Autonomous Operation of an Inverter-Based Microgrid", IEEE Transactions on Power Electronics, vol. 22, Issue 2, pp. 613-625, Mar. 2007.

Brabandere et al., "Control of Microgrids", IEEE Power Engineering Society General Meeting, pp. 8, Jun. 24-28, 2007.

Brabandere et al., "A Voltage and Frequency Droop Control Method for Parallel Inverters", IEEE Transactions on Power Electronics, vol. 22, Issue 4, pp. 1107-1115, Jul. 2007.

Sao et al., "Control and Power Management of Converter Fed Microgrids", IEEE Transactions on Power Systems, vol. 23, Issue 3, pp. 1088-1098, Aug. 2008.

Vasquez et al., "Adaptive Droop Control Applied to Voltage-Source Inverters Operating in Grid-Connected and Islanded Modes", IEEE Transactions on Industrial Electronics, vol. 56, Issue 10, pp. 4088-4096, Oct. 2009.

Iyer et al., "A Generalized Computational Method to Determine Stability of a Multi-inverter Microgrid", IEEE Transactions on Power Electronics, vol. 25, Issue 9, pp. 2420-2432, Sep. 2010.

Majumder et al., "Droop Control of Converter-Interfaced Microsources in Rural Distributed Generation", IEEE Transactions on Power Delivery, vol. 25, Issue 4, pp. 2768-2778, Oct. 2010.

Yao et al., "Design and Analysis of the Droop Control Method for Parallel Inverters Considering the Impact of the Complex Impedance on the Power Sharing", IEEE Transactions on Industrial Electronics, vol. 58, Issue 2, pp. 576-588, Feb. 2011.

Kim et al., "Mode Adaptive Droop Control With Virtual Output Impedances for an Inverter-Based Flexible AC Microgrid", IEEE Transactions on Power Electronics, vol. 26, Issue 3, pp. 689-701, Mar. 2011.

Rocabert et al., "Control of Power Converters in AC Microgrids", IEEE Transactions on Power Electronics, vol. 27, Issue 11, pp. 4734-4749, Nov. 2012.

Extended European Search Report dated Oct. 18, 2018 for Application No. 16808490.3.

Extended European Search Report and written opinion for Application No. EP20154040.8 dated Mar. 3, 2020.

\* cited by examiner

METHOD AND APPARATUS FOR CONTROL OF INTELLIGENT LOADS IN MICROGRIDS

CROSS-REFERENCE TO RELATED APPLICATIONS

This application claims benefit of U.S. provisional patent application Ser. No. 62/174,861, entitled "Control of Intelligent Loads in Microgrids" and filed Jun. 12, 2015, which is herein incorporated in its entirety by reference.

BACKGROUND OF THE INVENTION

Field of the Invention

Embodiments of the present disclosure relate generally to droop control and, more particularly, to using droop control techniques to control microgrid loads.

Description of the Related Art

In an electricity distribution grid, maintaining both grid frequency and voltage within an acceptable range is a necessary requirement for the stable operation of power systems. Accordingly, energy consumption and production must be balanced at all times; any significant imbalance could cause grid instability or severe fluctuations that result in failures within the grid.

AC generators coupled to the grid may employ droop control for managing grid fluctuations. Droop control is an industry standard technique for autonomously sharing load among parallel AC generators proportional to their power ratings. The technique relies on using small changes in grid voltage and frequency to dictate changes in active and reactive power levels generated by the AC generators. Using droop control, the AC generators can respond to grid fluctuations by increasing or decreasing active and reactive power output in order to stabilize the grid.

In addition to supporting grid stability by adjusting generated power levels, some non-critical "smart" loads may use an automated load-shedding technique to support the grid by shutting off during certain grid events. Such automated load-shedding however only provides a gross adjustment of the load, i.e., either on or off.

Therefore, there is a need in the art for an efficient technique for controlling loads to support grid stabilization.

SUMMARY OF THE INVENTION

Embodiments of the present invention generally relate controlling a microgrid load as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
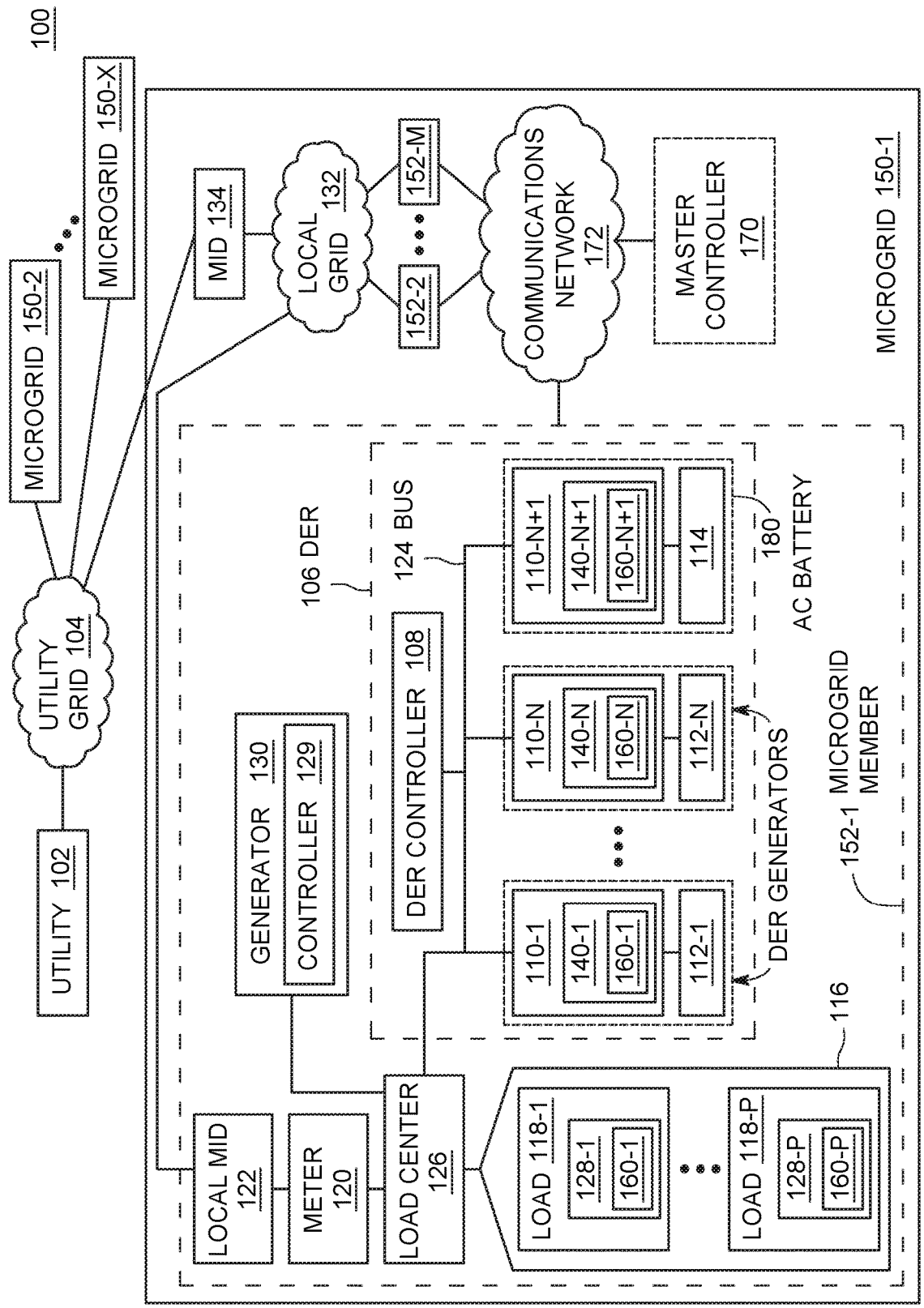
FIG. 1 is a block diagram of a power system in accordance with one or more embodiments of the present invention.

FIG. 1 is a block diagram of a power system 100 in accordance with one or more embodiments of the present invention. This diagram only portrays one variation of the myriad of possible system configurations. The present invention can function in a variety of environments and systems.

The power system 100 comprises a utility 102 (such as a conventional commercial utility) and a plurality of microgrids 150-1, 150-2, . . . , 150-X (collectively referred to as microgrids 150) coupled to the utility 102 via a utility grid 104. Through their connections to the utility grid 104, each microgrid 150 as a whole may receive energy from the utility grid 104 or may place energy onto the utility grid 104. In some embodiments, coupling energy to a commercial utility grid is strictly controlled by regulation and the microgrids 150 maintain or strive to maintain a zero-energy output policy.

Each microgrid 150 is capable of operating without energy supplied from the utility 102 and may cover a neighborhood, a village, a small city, or the like, as the term "microgrid" is not intended to imply a particular system size.

Although the microgrid 150-1 is depicted in detail in FIG. 1 and described herein, the microgrids 150-2 through 150-X are analogous to the microgrid 150-1. However, the number and/or type of various microgrid components may vary among the microgrids 150.

The microgrid 150-1 comprises a plurality of microgrid members 152-1, 152-2, . . . , 152-M (collectively referred to as microgrid members 152), each of which is a microgrid that can operate when isolated from the rest of the microgrid 150. The microgrid members 152 are coupled to a local grid 132 which in turn is coupled to the utility grid 104 via a microgrid interconnect device (MID) 134 (which may also be referred to as an island interconnect device, or IID). The local grid 132 may be a trunk of the utility grid 104 or it may be a specifically designed local grid for the microgrid 150-1.

The MID 134 determines when to disconnect/connect the microgrid 150-1 from/to the utility grid 104 and performs the disconnection/connection. When connected to the utility grid 104, the microgrid 150-1 operates in a grid-connected (GC) mode; when disconnected from the utility grid 104, the microgrid 150-1 operates in an islanded (IS) mode. In some embodiments, the MID 134 may provide an indication of the grid connection and/or disconnection to one or more components of the microgrid 150-1 in order for the components to operate in a mode corresponding to the state of the grid-connectivity; additionally or alternatively, in some embodiments the MID 134 may provide one or more operating parameters to one or more components of the microgrid 150-1. Generally, the MID 134 comprises a disconnect component (e.g., a disconnect relay) along with a CPU (not shown) and an islanding module (not shown) and monitors the utility grid 104 for failures or disturbances, determines when to disconnect from/connect to the utility grid 104, and drives the disconnect component accordingly. For example, the MID 134 may detect a fluctuation, disturbance or outage with respect to the utility grid 104 and, as a result, disconnect the microgrid 150-1 from the utility grid 104. The MID 134 may also disconnect the microgrid 150-1 from the utility grid 104 when the microgrid 150-1 is either overproducing energy or overloading the utility grid 104. Once disconnected from the utility grid 104, the microgrid 150-1 can continue to generate power as an intentional island without imposing safety risks on any line workers that may be working on the utility grid 104. The MID 134 may additionally comprise a transceiver (not shown) for communicating with one or more of the microgrid components. In some embodiments, the MID 134 may receive instructions from another component or system for disconnecting from/connecting to the utility grid 104.

The microgrid member 152-1 comprises a building 116 (e.g., a residence, commercial building, or the like) coupled to a load center 126 which may be within or outside of the building 116. The load center 126 is coupled to the local grid 132 via a utility meter 120 and a local MID 122, a distributed energy resource (DER) 106, a generator 130, and a plurality of loads 118-1 . . . 118-P (collectively referred to as loads 118) for coupling power among these components. Although the microgrid member 152-1 is depicted in detail in FIG. 1 and described herein, the microgrid members 152-2 through 152-M are analogous to the microgrid member 152-1. However, the number and/or types of various microgrid member components may vary among the microgrid members 152.

The local MID 122 determines when to disconnect/connect the microgrid member 152-1 from/to the local grid 132 and performs the disconnection/connection. For example, the local MID 122 may detect a grid fluctuation, disturbance or outage and, as a result, disconnect the microgrid member 152-1 from the local grid 132. The MID 122 may also disconnect the microgrid member 152-1 from the local grid 132 when the microgrid member 152-1 is either overproducing energy or overloading the local grid 132. When connected to the local grid 132, the microgrid member 152-1 operates in a grid-connected (GC) mode; when disconnected from the local grid 132, the microgrid member 152-1 operates in an islanded (IS) mode. In some embodiments, the local MID 122 may provide an indication of the grid connection and/or disconnection to one or more components of the microgrid member 152-1 in order for the components to operate in a mode corresponding to the state of the grid-connectivity; additionally or alternatively, in some embodiments the local MID 122 may provide one or more operating parameters to one or more components of the microgrid member 152-1. Once disconnected from the local grid 132, the microgrid member 152-1 can continue to generate power as an intentional island without imposing safety risks on any line workers that may be working on the local grid 132. The local MID 122 comprises a disconnect component (e.g., a disconnect relay) for physically disconnecting from/connecting to the local grid 132. The local MID 122 may additionally comprise a CPU (not shown) and an islanding module (not shown) for monitoring grid health, detecting grid failures and disturbances, determining when to disconnect from/connect to the local grid 132, and driving the disconnect component accordingly. The local MID 122 may additionally comprise a transceiver (not shown) for communicating with one or more of the microgrid member components. In some embodiments, the local MID 122 may receive instructions from another component or system for disconnecting from/connecting to the local grid 132.

The meter 120 measures the ingress and egress of energy for the microgrid member 152-1; in some embodiments, the meter 120 comprises the MID 122 or a portion thereof. The meter 120 generally measures active power flow (kWh), reactive power flow (kVAR), grid frequency, and grid voltage (referred to herein as the measured parameters). In certain embodiments these measured parameters may be communicated to a microgrid monitoring system (not shown) that monitors each of the microgrid members 152.

The DER 106 comprises power conditioners 110-1 . . . 110-N, 110-N+1 coupled in parallel to a bus 124 that is further coupled to the load center 126. Generally, the power conditioners 110 are bi-directional power conditioners and a first subset of the power conditioners 110 generate power from DC energy sources (e.g., renewable energy sources such as wind, solar, hydro, and the like) while a second subset of the power conditioners 110 generate power from/couple energy to energy storage/delivery devices (e.g., batteries or the like), as described below. The combination of a DC energy source and a corresponding power conditioner 110 may be referred to herein as a DER generator. In those embodiments where the power conditioners 110 are DC-AC inverters, a power conditioner 110 coupled to an energy storage/delivery device may together be referred to as an AC battery; in those embodiments where the power conditioners 110 are DC-DC converters, a power conditioner 110 coupled to an energy storage/delivery device may together be referred to as a battery DC supply.

In one or more embodiments, such as the embodiment depicted in FIG. 1, the power conditioners 110-1 . . . 110-N are respectively coupled to DC energy sources 112-1 . . . 112-N (e.g., renewable energy sources such as wind, solar, hydro, and the like) for receiving DC power and generating commercial grid-compliant AC power that is coupled to the bus 124. In some of these embodiments, each DC source 112 is a photovoltaic (PV) module. In some alternative embodiments, multiple DC sources 112 are coupled to a single power conditioner 110 (e.g., a single, centralized power conditioner).

As further depicted in FIG. 1, the power conditioner 110-N+1 is coupled to an energy storage/delivery device 114 to form an AC battery 180. The power conditioner 110 of the AC battery 180 can convert AC power from the bus 124 to energy that is stored in the energy storage/delivery device 114, and can further convert energy from the energy storage/delivery device 114 to commercial grid-compliant AC power that is coupled to the bus 124. The energy storage/delivery device 114 may be any energy storage device having a "charge level", such as a battery, flywheel, compressed air storage, or the like. Although only a single AC battery 180 is depicted in FIG. 1, other embodiments may comprise more AC batteries 180 or even no AC batteries 180.

Each of the power conditioners 110 comprises a power conditioner controller 140 (described further below with respect to FIG. 2) having a droop control module 160 for implementing droop control techniques that allow the power conditioners 110 to share the load in a safe and stable manner when the microgrid member 152-1 is disconnected from the utility 102 or the local grid 132. In some alternative embodiments, the power conditioners 110 may also be controlled using droop techniques when operating in a grid-connected mode; one example of such operation may be found in commonly-assigned U.S. provisional patent application Ser. No. 62/286,669, entitled "Droop Control in a Grid-Connected Microgrid" and filed Jan. 25, 2016, which is herein incorporated in its entirety by reference.

The DER 106 further comprises a DER controller 108 that is coupled to the bus 124 and communicates with the power conditioners 110 (e.g., via power line communications (PLC) and/or other types of wired and/or wireless techniques). The DER controller 108 comprises a transceiver, support circuits, and a memory, each coupled to a CPU (not shown). The CPU 202 may comprise one or more conventionally available microprocessors or microcontrollers; alternatively, the CPU 202 may include one or more application specific integrated circuits (ASICs). The DER controller 108 may send command and control signals to one or more of the power conditioners 110 and/or receive data (e.g., status information, performance data, and the like) from one or more of the power conditioners 110. In some embodiments, the DER controller 108 may be a gateway that is further coupled, by wireless and/or wired techniques, to a master controller 170 via a communication network 172 (e.g., the Internet) for communicating data to/receiving data from the master controller 170 (e.g., performance information and the like).

In certain embodiments, the DER controller 108 comprises the local MID 122 or a portion of the local MID 122. For example, the DER controller 108 may comprise an islanding module for monitoring grid health, detecting grid failures and disturbances, determining when to disconnect from/connect to the local grid 132, and driving a disconnect component accordingly, where the disconnect component may be part of the DER controller 108 or, alternatively, separate from the DER controller 108. In some embodiments, the DER controller 108 may coordinate with the local MID 122, e.g., using PLC.

Although the microgrid member 152-1 is depicted in FIG. 1 as having a single DER 106, in other embodiments the microgrid member 152-1 may have additional DERs, each of which may be different types of DERs (e.g., solar, wind, and the like). In some alternative embodiments, the DER controller 108 and the DER generators are absent from the microgrid member 152-1 and the DER 106 comprises only one or more AC batteries 180.

In certain alternative embodiments, the power conditioners 110 are DC-DC converters that generate DC power and couple the generated power to a DC bus (i.e., the bus 124 is a DC bus in such embodiments). In such embodiments, the power conditioner 110-N+1 generates DC power from the energy storage/delivery device 114 and also receives input from the DC bus that is converted to energy for storage in the energy storage/delivery device 114.

The generator 130 is an energy generator, such as a diesel generator, that automatically increases or curtails energy output depending on the needs of the microgrid member 152-1. The generator 130 comprises a generator controller 129, described in detail further below with respect to FIG. 3. The generator controller 129 may optimize the operation of the generator 130 with respect to the microgrid member 152-1 and/or the microgrid 150-1 (e.g., by generating control instructions for the generator 130); implement control instructions for operating the generator 130 (e.g., instructions received from another component or system); obtain data pertaining to the generator 130 (e.g., performance data, operational data, or the like) which may further be communicated to another component or system; or perform similar functions. The generator controller 129 comprises the droop control module 160, described below with respect to FIG. 3, for implementing droop control techniques to control operation of the generator 130 when the microgrid member 152-1 is operating in an islanded mode, although in some alternative embodiments the generator 130 may also be controlled using droop control when operating in a grid-connected mode.

The power conditioners 110 and the generator 130 are droop-controlled such that when the microgrid member 152-1 is disconnected from the local grid 132 or the utility grid 104 (e.g., using the MID 122 and/or the MID 134) and operating in an autonomous mode, the power conditioners 110 and the generator 130 employ the same droop control technique for parallel operation without the need for any common control circuitry or communication among the components.

The loads 118 are non-critical loads (e.g., hot water heaters, refrigerators, HVAC equipment, pumps, electric cars, room lighting, and the like) that consume energy from the transmission line electrically interconnecting the microgrid components (which may be referred to as the microgrid member grid, the microgrid grid, or simply the grid) obtained via the load center 126. Although the loads 118 are depicted in FIG. 1 as within the building 116, one or more of the loads 118 may be located outside of the building 116. The loads 118 may be static loads, dynamic loads, or some combination thereof (i.e., some of the loads 118 are static loads while others are dynamic loads).

The loads 118 are intelligent loads that each comprise a load controller 128, described further below with respect to FIG. 4, for controlling operation of the corresponding load 118 (e.g., for implementing preset control instructions and/or control instructions received from another system component, for example via PLC), obtaining data pertaining to the corresponding load 118 (e.g., performance data, operational data, and the like) which may further be communicated to another component or system; and/or performing similar functions.

In accordance with one or more embodiments of the present invention, each load controller 128-1 . . . 128-P comprises a droop control module 160-1 . . . 160-P (collectively referred to as droop control modules 160) for utilizing a droop control technique to modulate operation of the corresponding load 118 as described herein. The droop control technique employed by the loads 118 is the same as the droop control technique employed by the power conditioners 110 and the generator 130—i.e., the loads 118, the power conditioners 110 and the generator 130 each utilize the same droop equations to determine active and/or reactive current values needed to stabilize the grid. In some alternative embodiments, one or more of the loads 118, the power conditioners 110, and the generator 130 may employ droop equations having different gains and/or different line impedance X/R ratios, although optimal operation occurs when these are coordinated with each other.

While the computed active and/or reactive current values are used by the power conditioners 110 and the generator 130 as set-point values in generating their outputs, each of the loads 118 uses the computed active and/or reactive current values—which may be referred to as "virtual generator set-points" or simply "set-points"—in determining control of the load 118 to support stabilization of the grid as described below. Each of the loads 118 can thus be controlled as a "virtual generator" to increase or decrease current on the grid based on a droop control technique.

Generally, the power conditioners 110, generator 130, and loads 118 employ droop control only when operating in an islanded mode, although in some alternative embodiments they additionally or alternatively employ droop control when operating in a grid-connected mode, for example as described in previously-mentioned U.S. provisional patent application Ser. No. 62/286,669, entitled "Droop Control in a Grid-Connected Microgrid".

During islanded operation, the loads 118 use locally-measured AC voltage and/or frequency (i.e., the voltage and/or frequency measured on the grid) and droop equations to calculate the active and/or reactive current values which would be used as current set-points by the power conditioners 110 and the generator 130 (which may be referred to herein as "generator current set-points" or "current set-points"). The computed active and/or reactive current set-point values are then used to intelligently control operation of the load 118 to support grid stabilization. For example, if a load 118 is operating in an "on" state and computes an active current set-point that exceeds a particular threshold, the computed current set-point indicates that additional active current is needed on the grid for grid stabilization and the load 118 can shut down in order to allow some of the active current on the grid to be used by critical loads (not shown). Alternatively, if the load 118 is in an "off" state and computes an active current set-point that is below a particular threshold, the computed current set-point indicates that less active current is needed on the grid for grid stabilization and the load 118 can turn on to absorb some of the excess power to do useful work. As another example, a water heater may be programmed to turn on if its temperature drops below a certain minimum threshold when is excess generation available, as might typically occur for a solar generator system on a sunny day after all storage assets have been fully charged. Generally, for static loads the turn-on threshold would be made higher than the turn-off threshold, thereby creating droop hysteresis to avoid unstable operation.

By operating in such a manner, the non-critical microgrid loads 118 appear as "virtual generators" for stabilizing the grid and thus increase the value of the loads 118 as stabilization assets by enabling the microgrid member 152-1/microgrid 150-1 to operate more efficiently without requiring any additional active management.

In some embodiments, for those loads which can only affect active current, only the active current droop is calculated. In such embodiments, both voltage and frequency measurements are required to compute the active current set-point when the droop line impedance ratio X/R is between 0 and 1 (i.e., if X/R is not exactly equal to 0 or not exactly equal to 1).

The droop technique used by the power conditioners 110, the generator 130, and the loads 118 in computing the current set-points may be any suitable droop technique, such as a classic volt-VAr-frequency-watt droop technique (i.e., where active power is a function of frequency only and reactive power is a function of voltage only), a cross-coupled volt-VAr-frequency-watt droop technique (i.e., where the reactive and active currents are a function of both voltage and frequency), a volt-VAr technique, a frequency-watt technique, or any other suitable droop-technique. One example of a droop technique that may be used can be found in commonly assigned U.S. patent application Ser. No. 15/048,651, entitled "Method and Apparatus for Time-Domain Droop Control with Integrated Phasor Current Control" and filed Feb. 19, 2016, which is herein incorporated in its entirety by reference. In some other embodiments, the droop-control module 160 may determine active and reactive power set-points, rather than or in addition to the current set-points, for determining control of the corresponding load 118.

The current set-points, which indicate whether a generator would be commanded to increase or decrease its active and/or reactive currents in order to support grid stabilization, are then used in determining (e.g., via a state machine) control of the load 118. Based on whether the load 118 draws active and/or reactive current, one or both of the current set-points are used along with one or more load parameters (e.g., present load operating state, amount of current drawn, load criticality, a required operating range for the load, one or more thresholds for increasing and/or reducing active and/or reactive current drawn by the load 118, and the like) for determining load control. For example, in some embodiments if the active current set-point exceeds a first threshold and the state of the load 118 is within an acceptable range to turn the load 118 off, the load 118 turns off; if the active current set-point falls below a second threshold and the state of the load 118 is within an acceptable range to turn the load 118 on, the load 118 turns on. In such embodiments, the first and second thresholds are generally set to different values in order to prevent the load 118 from dithering between on and off states, although in certain embodiments the first and second thresholds may be set to the same value. In still other embodiments, in addition to or instead of turning the load 118 on and off, the load 118 may be controlled to draw more or less active and/or reactive current based on one or both of the current set-points.

In some embodiments, the power conditioners 110, generator 130, and loads 118 determine the presence of a grid connection via a grid connection signal (e.g., a tone; the absence of a tone; a PLC communication; a signal from an Internet connection; or the like) received from a measurement device located at a common point in the microgrid 150-1; for example; a 'grid-connected' signal may be created by the MID 134 and communicated using PLC. In certain embodiments, an island indicator that indicates the microgrid 150-1 is in an islanded mode may be used in addition to or in place of the grid connection signal; in those embodiments where the island indicator is used in place of the grid connection signal, the power conditioners 110, generator 130, and loads 118 may determine that they are grid-connected based on the absence of the island indicator.

In one or more alternative embodiments, communication may be used in a non-critical manner to offset the load control previous described. For example, in addition to the operation of the loads 118 for primary control as described above, secondary control commands may be sent to the loads 118 to re-center grid voltage and frequency.

Figure 2:
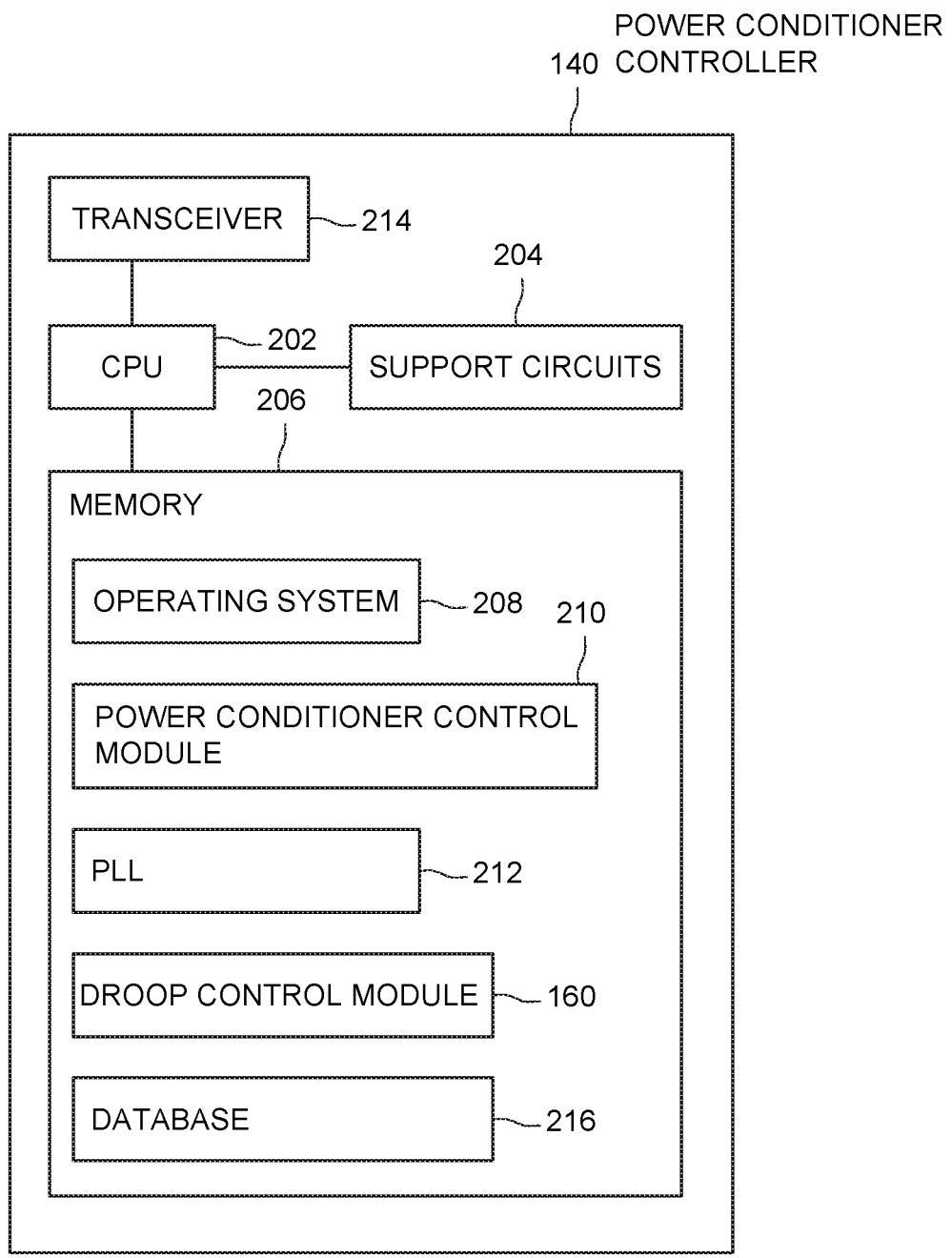
FIG. 2 is a block diagram of a power conditioner controller in accordance with one or more embodiments of the present invention.

FIG. 2 is a block diagram of a power conditioner controller 140 in accordance with one or more embodiments of the present invention. The power conditioner controller 140 comprises a transceiver 214, support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The power conditioner controller 140 may be implemented using a general purpose computer that, when executing particular software, becomes a specific purpose computer for performing various embodiments of the present invention. In one or more embodiments, the CPU 202 may be a microcontroller comprising internal memory for storing controller firmware that, when executed, provides the controller functionality described herein.

The transceiver 214 may be coupled to the power conditioner's output lines for communicating with the DER controller 108 and/or other power conditioners 110 using power line communications (PLC). Additionally or alternatively, the transceiver 214 may communicate with the DER controller 108 and/or other power conditioners 110 using other type of wired communication techniques and/or wireless techniques.

The support circuits 204 are well known circuits used to promote functionality of the CPU 202. Such circuits include, but are not limited to, a cache, power supplies, clock circuits, buses, input/output (I/O) circuits, and the like.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the power conditioner controller 140 that can be supported by the CPU capabilities. In some embodiments, the OS 208 may be one of a number of commercially available operating systems such as, but not limited to, LINUX, Real-Time Operating System (RTOS), and the like.

The memory 206 stores various forms of application software, such as a phase lock loop (PLL) module 212 that measures, when executed, grid voltage and frequency; the droop control module 160 for determining, when executed, real and/or reactive current set-points for droop control; and a power conditioner control module 210 for controlling, when executed, one or more aspects of the power conditioner 110 pertaining to power conversion (e.g., maximum power point tracking (MPPT), power conversion based on one or more set-points, and the like). The memory 206 additionally stores a database 216 for storing data related to the operation of the power conditioner 110 and/or the present invention. In various embodiments, one or more of the power conditioner control module 210, the PLL 212, the droop control module 160, and the database 222, or portions thereof, are implemented in software, firmware, hardware, or a combination thereof.

Figure 3:
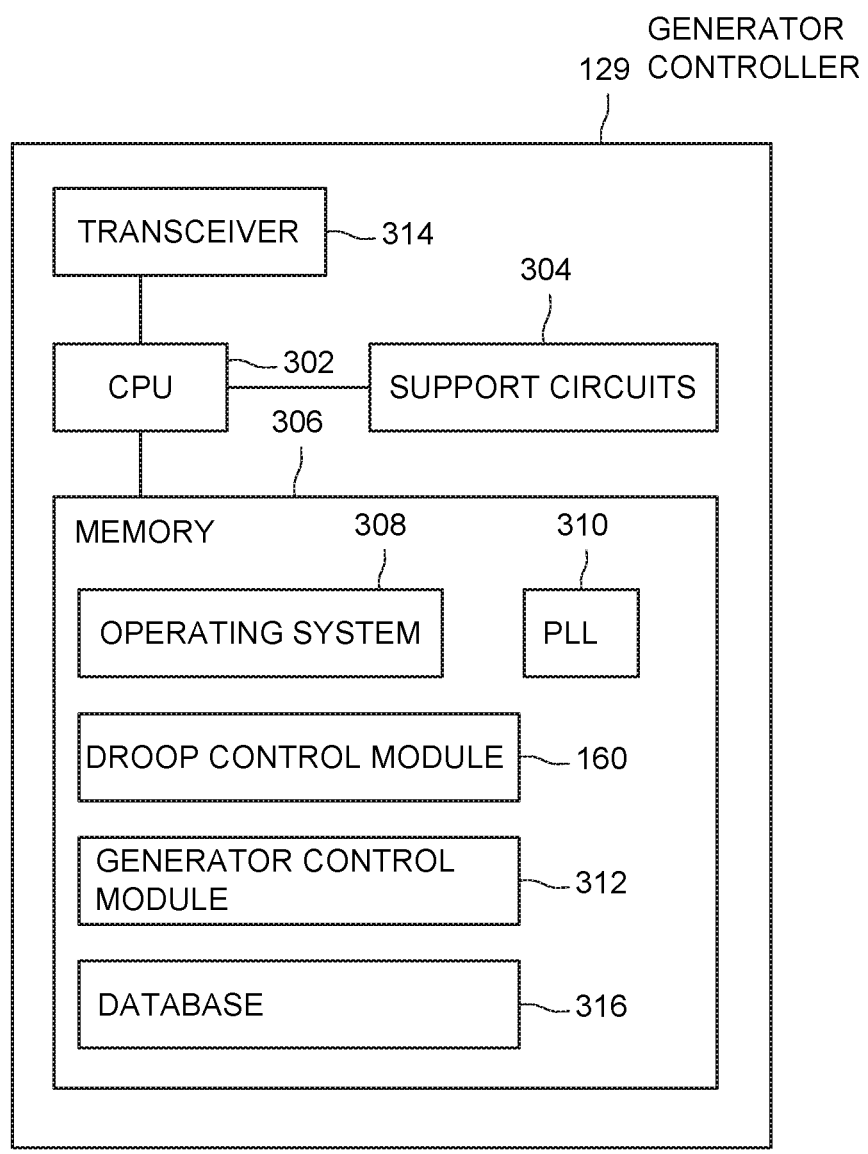
FIG. 3 is a block diagram of a generator controller in accordance with one or more embodiments of the present invention.

FIG. 3 is a block diagram of a generator controller 129 in accordance with one or more embodiments of the present invention. The generator controller 129 comprises a transceiver 314, support circuits 304 and a memory 306, each coupled to a central processing unit (CPU) 302. The CPU 302 may comprise one or more conventionally available microprocessors or microcontrollers; alternatively, the CPU 302 may include one or more application specific integrated circuits (ASICs). The generator controller 129 may be implemented using a general purpose computer that, when executing particular software, becomes a specific purpose computer for performing various embodiments of the present invention. In one or more embodiments, the CPU 302 may be a microcontroller comprising internal memory for storing controller firmware that, when executed, provides the controller functionality described herein.

The generator controller 129 may communicate, via the transceiver 314, with other components of the microgrid 150-1 using PLC, although additionally or alternatively other types of wired and/or wireless communication techniques may be used. In some embodiments, the generator controller 129 may further communicate via the transceiver 314 with other controllers within the microgrid and/or with a master controller (not shown).

The support circuits 304 are well-known circuits used to promote functionality of the CPU 302. Such circuits include, but are not limited to, a cache, power supplies, clock circuits, buses, input/output (I/O) circuits, and the like.

The memory 306 may comprise random access memory, read only memory, removable disk memory, flash memory, and various combinations of these types of memory. The memory 306 is sometimes referred to as main memory and may, in part, be used as cache memory or buffer memory. The memory 306 generally stores the operating system (OS) 308, if necessary, of the generator controller 129 that can be supported by the CPU capabilities. In some embodiments, the OS 308 may be one of a number of commercially available operating systems such as, but not limited to, LINUX, Real-Time Operating System (RTOS), and the like.

The memory 306 stores various forms of application software, such as a PLL 310 that measures, when executed, grid voltage and frequency; the droop control module 160 for determining, when executed, real and/or reactive current set-points for droop control; a generator control module 312 for controlling, when executed, operation of the generator 130. The memory 306 additionally stores a database 316 for storing data related to the operation of the generator 130 and/or the present invention. In various embodiments, one or more of the PLL 310, the droop control module 160, the generator control module 312, and the database 316, or portions thereof, are implemented in software, firmware, hardware, or a combination thereof.

Figure 4:
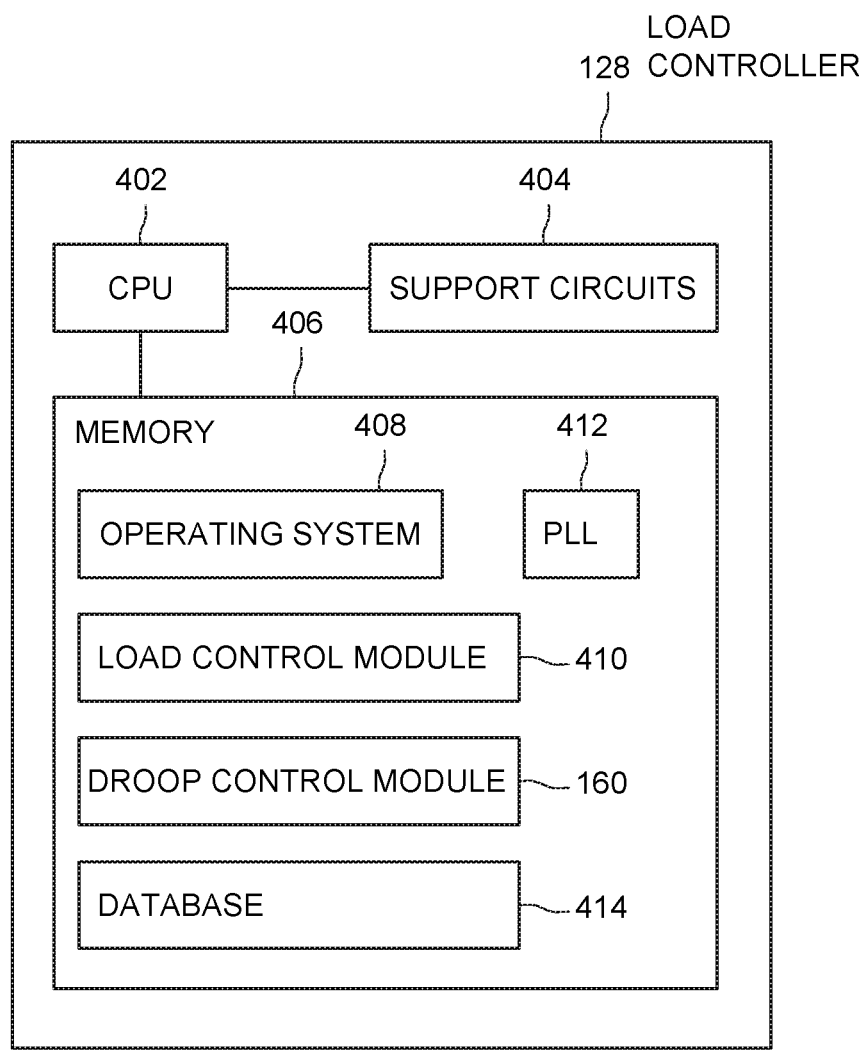
FIG. 4 is a block diagram of a load controller in accordance with one or more embodiments of the present invention.

FIG. 4 is a block diagram of a load controller 128 in accordance with one or more embodiments of the present invention. The load controller 128 comprises support circuits 404 and a memory 406, each coupled to a central processing unit (CPU) 402. The CPU 402 may comprise one or more conventionally available microprocessors or microcontrollers; alternatively, the CPU 402 may include one or more application specific integrated circuits (ASICs). The load controller 128 may be implemented using a general purpose computer that, when executing particular software, becomes a specific purpose computer for performing various embodiments of the present invention. In one or more embodiments, the CPU 402 may be a microcontroller comprising internal memory for storing controller firmware that, when executed, provides the controller functionality described herein.

The support circuits 404 are well-known circuits used to promote functionality of the CPU 402. Such circuits include, but are not limited to, a cache, power supplies, clock circuits, buses, input/output (I/O) circuits, and the like.

The memory 406 may comprise random access memory, read only memory, removable disk memory, flash memory, and various combinations of these types of memory. The memory 406 is sometimes referred to as main memory and may, in part, be used as cache memory or buffer memory. The memory 406 generally stores the operating system (OS) 408, if necessary, of the load controller 128 that can be supported by the CPU capabilities. In some embodiments, the OS 408 may be one of a number of commercially available operating systems such as, but not limited to, LINUX, Real-Time Operating System (RTOS), and the like.

The memory 406 stores various forms of application software, such as a PLL 412 that measures, when executed, grid voltage and frequency; the droop control module 160 for determining, when executed, real and/or reactive current set-points for use as described herein; and a load control module 410 for controlling, when executed, operation of the load (e.g., based on the computed current set-points). Further detail on the functionality provided by the PLL 412, the droop control module 160, and the load control module 410 is described below with respect to FIGS. 5 and 6.

The memory 406 additionally stores a database 412 for storing data related to the load, operation of the load, and/or the present invention (e.g., one or more thresholds for comparison to computed set-point currents, one or more thresholds for required load operating range, and the like). In various embodiments, one or more of the PLL 412, the droop control module 160, the load control module 410, and the database 414, or portions thereof, are implemented in software, firmware, hardware, or a combination thereof.

Since the power conditioners 110, the generator 130 and the loads 118 each use the same droop control module 160 and thus the same droop equations, each of the loads 118 "knows" the level of active and/or reactive current that the power conditioner 110 and generator 130 are currently running at. The loads 118 can then use this information to make intelligent decisions to help stabilize the grid via modification of the load operation. In other embodiments, one or more of the loads 118, the power conditioners 110, and the generator 130 may use droop equations having different gains and/or different line impedance X/R ratios, although optimal operation occurs when these are coordinated with each other.

Figure 5:
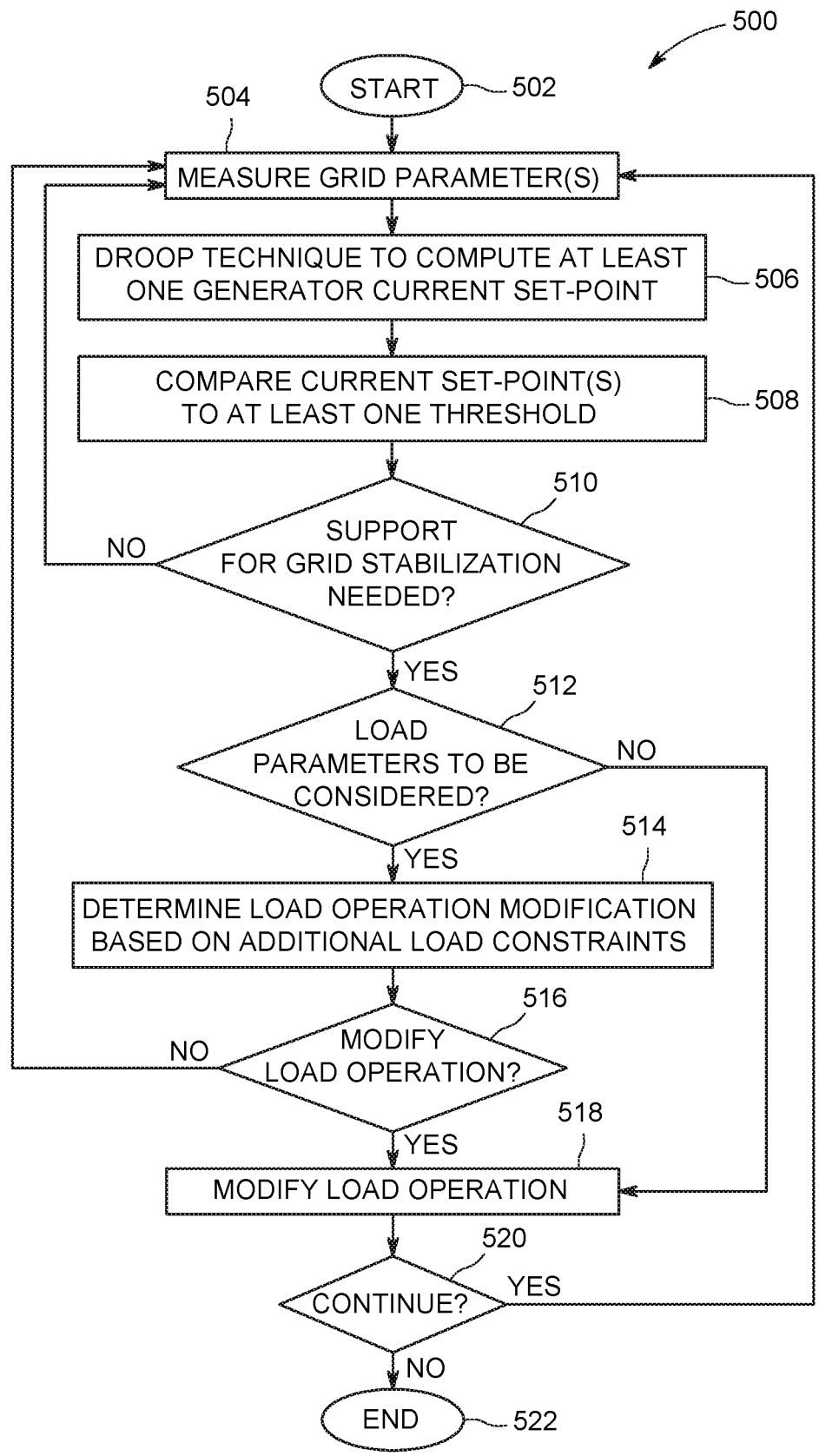
FIG. 5 is a flow diagram of a method for intelligent control of a microgrid load in accordance with one or more embodiments of the present invention.

FIG. 5 is a flow diagram of a method 500 for intelligent control of a microgrid load in accordance with one or more embodiments of the present invention. In some embodiments, portions of the method 500 are implementations of the PLL 412, the droop control module 160, and the load control module 410. In some embodiments, a computer readable medium comprises a program that, when executed by a processor, performs at least a portion of the method 500 that is described in detail below.

In some embodiments, such as the embodiment described below, the microgrid load is part of a microgrid, such as the load 118 and the microgrid member 152-1/microgrid 150-1 previously described, that is operating in an islanded mode. The components of the microgrid are electrically interconnected by an AC transmission grid, which may be referred to as "the grid", as previously described. In certain embodiments, the load may be a static load, while in other embodiments the load may be a dynamic load.

The method 500 begins at step 502 and proceeds to step 504. At step 504, the voltage and/or frequency on the grid (i.e., one or more grid parameters) are measured. The grid parameter(s) may be measured by a phase lock loop (PLL) of the load (such as the PLL 412), although alternatively other techniques may be used instead. The method 500 proceeds to step 506.

At step 506, a droop technique is used to compute an active and/or reactive current set-point using one or both of the measured grid parameters. In some embodiments, for those loads which can only affect active current, only the active current set-point is computed. In such embodiments, both grid voltage and frequency measurements are required to compute the active current set-point if the droop line impedance ratio X/R is between 0 and 1 (i.e., if X/R is not exactly equal to 0 or not exactly equal to 1).

Any suitable droop technique may be used, such as a classic volt-VAr-frequency-watt droop technique (i.e., where active power is a function of frequency only and reactive power is a function of voltage only), a cross-coupled volt-VAr-frequency-watt droop technique (i.e., where the reactive and active currents are a function of both voltage and frequency), a volt-VAr technique, a frequency-watt technique, or any suitable droop-technique. In some other embodiments, the droop-control module 160 may determine active and/or reactive power set-point values, rather than or in addition to the current set-point values.

The method 500 proceeds to step 508, where the current set-point values are compared to one or more thresholds to determine whether grid stabilization is needed and what type of grid support is needed for stabilization (i.e., whether more or less current is needed on the grid). Generally, each current set-point is compared to a corresponding upper threshold and a corresponding lower threshold; for example, when the active current set-point exceeds the corresponding upper threshold, additional active current is needed to stabilize the grid, and when the active current set-point is less than the corresponding lower threshold, less active current is needed. For a particular type of current set-point (i.e., active or reactive), the upper and lower thresholds are generally different from one another, although in some embodiments the upper and lower threshold may be equal to one another and a particular current set-point is compared to only a single threshold. The method 500 proceeds to step 510.

At step 510, a determination is made, based on the comparison(s) in step 508, whether support is needed to stabilize the grid. If the result of the determination is no, i.e., the comparison in step 508 indicates that support is not needed to stabilize the grid, the method 500 returns to step 504. If the result of the determination is yes, i.e., the comparison in step 508 indicates that support is needed to stabilize the grid, the method 500 proceeds to step 512.

At step 512, a determination is made whether there are any load parameters to be considered in determining the modification to the load operation. Such load parameters may include one or more of the present load operating state, amount of active and/or reactive current drawn by the load, load criticality, a required operating range for the load, one or more thresholds for increasing active and/or reactive current drawn by the load, one or more threshold for decreasing active and/or reactive current drawn by the load, and the like. If the result of the determination at step 512 is no, that there are no load parameters to be considered, the method 500 proceeds to step 518. If the result of the determination at step 512 is yes, that there are load parameters to be considered, the method 500 proceeds to step 514.

At step 514, the load parameters are used to determine whether any modification to the operation of the load is to be made and, if such a modification is to be made, the particular modification to be made. For example, in some embodiments the load may be a hot water heater that has a required temperature range for operation. If the temperature of the hot water heater is within the required range, the operating state of the hot water heater may be modified (i.e., turned on or off) as needed for grid support; if the temperature is outside of the required range, the operating state of the hot water heater is prohibited from being modified even when the determined current set-points indicate grid support is needed.

At step 516, a determination is made whether load operation is to be modified. If the result of the determination is no, that the load operation is not to be modified, the method 500 returns to step 504. If the result of the determination is yes, that the load operation is to be modified, the method 500 proceeds to step 518.

At step 518, the determined modification is made to the load operation. The method 500 then proceeds to step 520, where a determination is made whether to continue. If the result of the determination is to continue, the method 500 returns to step 504. If the result of the determination to continue, the method 500 proceeds to step 522 where it ends.

In one or more embodiments, the steps of the method 500 may be performed in an order different from that described above. For example, in some embodiments the load parameters may be used in making a determination whether load operation can be modified prior to comparing the current set-points to their thresholds.

In certain embodiments, a state machine may use the computed current set-points as well as any necessary load parameters to be considered for determining control of the load. In some such embodiments, the load control module 410 may comprise such a state machine.

Figure 6:
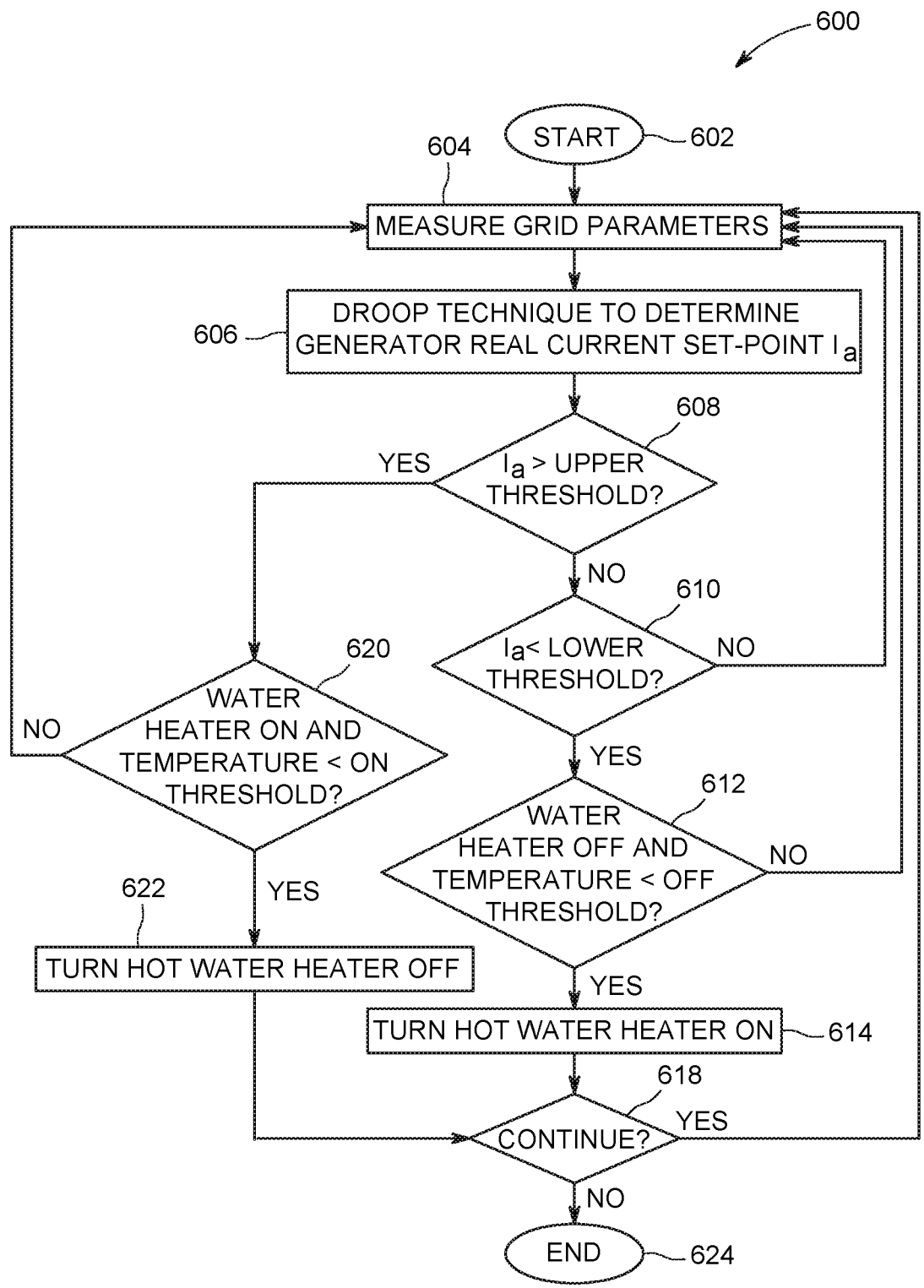
FIG. 6 is a flow diagram of a method for intelligent control of a hot water heater in a microgrid in accordance with one or more embodiments of the present invention.

FIG. 6 is a flow diagram of a method 600 for intelligent control of a hot water heater in a microgrid in accordance with one or more embodiments of the present invention. In one embodiment, portions of the method 600 are implementations of the PLL 412, the droop control module 160, and the load control module 410. In some embodiments, a computer readable medium comprises a program that, when executed by a processor, performs at least a portion of the method 600 that is described in detail below.

The method 600 is an exemplary embodiment of the method 500 where the microgrid load is a hot water heater. The method 600 starts at step 602 and proceeds to step 604. At step 604, grid voltage and grid frequency are measured, for example by a PLL of the water heater (such as the PLL 412). At step 606, a droop technique is used to determine the generator active current set-point Ia. The method 600 proceeds to step 608.

At step 608, a determination is made whether the active current set-point Ia exceeds an upper threshold. If the result of the determination is yes, the active current set-point Ia exceeds the upper threshold, the method 600 proceeds to step 620. At step 620, a determination is made whether the water heater is on and the water temperature exceeds an on-threshold for the water heater. If the result of the determination is no, the method 600 returns to step 604. If the result of the determination is yes, the method 600 proceeds to step 622. At step 622, the hot water heater is turned off, and the method 600 proceeds to step 618.

If the result of the determination made at step 608 is no, the active current set-point Ia does not exceed the upper threshold, the method 600 proceeds to step 610. At step 610, a determination is made whether the active current set-point Ia is less than a lower threshold. If the result of the determination is no, the active current set-point Ia is not less than the lower threshold, the method 600 returns to step 604. If the result of the determination is yes, the active current set-point Ia is less than the lower threshold, the method 600 proceeds to step 612.

At step 612, a determination is made whether the water heater is presently off and the water temperature is less than an off-threshold for the water heater. If the result of the determination is no, the method 600 returns to step 604. If the result of the determination is yes, the method 600 proceeds to step 614. At step 614, the hot water heater is turned on, and the method 600 proceeds to step 618.

At step 614, a determination is made whether to continue. If the result of the determination is yes, the method 600 returns to step 604. If the result of the determination is no, the method 600 proceeds to step 624 where it ends.

In one or more embodiments, the steps of the method 600 may be performed in an order different from that described above. For example, in some embodiments the present operating state of the water heater (i.e., on or off) and whether the present water temperature satisfies the water heater's on-threshold or off-threshold may be used in making a determination whether operation of the water heater can be modified prior to comparing the active current set-point to the upper or lower thresholds.

In certain embodiments, a state machine may use the computed active current set-point as well as the present water heater operating state (i.e., on or off), water temperature, and water heater on- and off-thresholds for determining control of the water heater. In some such embodiments, the load control module 410 may comprise such a state machine.

While the foregoing is directed to embodiments of the present invention, other and further embodiments of the invention may be devised without departing from the basic scope thereof, and the scope thereof is defined by the claims that follow.

The invention claimed is:

1. A method for controlling a microgrid load, comprising:
measuring, by a load controller that is part of a load in a microgrid, the load controller comprising a processor, at least one grid parameter of a microgrid transmission line coupled to the load;
computing, by the load controller and using the measured at least one grid parameter and a droop control technique that is also utilized by a generator that is part of the microgrid, at least one virtual generator set-point, wherein each virtual generator set-point of the at least one virtual generator set-point is a current set-point which indicates whether the generator would be commanded to increase or decrease at least one of its active or reactive currents in order to support grid stabilization;
determining, by the load controller, a modification to operation of the load based on the at least one virtual generator set-point; and
modifying, by the load controller, operation of the load based on the modification.

2. The method of claim 1, further comprising:
comparing the at least one virtual generator set-point to at least one threshold;
and determining the modification based on the comparison.

3. The method of claim 1, wherein the modification is determined based additionally on at least one load parameter pertaining to the load.

4. The method of claim 3, wherein the at least one load parameter comprises one or more of present load operating state, amount of current drawn by the load, load criticality, a required operating range for the load, one or more thresholds for increasing current drawn by the load, and one or more thresholds for decreasing current drawn by the load.

5. The method of claim 2, wherein the at least one virtual generator set-point comprises a virtual active current set-point.

6. The method of claim 5, wherein the at least one threshold comprises an upper threshold and a lower threshold that form a hysteresis loop, and wherein (i) when the virtual active current set-point exceeds the upper threshold, the modification comprises controlling the load to reduce current drawn by the load.

7. The method of claim 6 wherein (ii) when the virtual active current set-point is below the lower threshold, the modification comprises controlling the load to increase current drawn by the load.

8. An apparatus for controlling a microgrid load, comprising:
a load controller that is part of a load in a microgrid, wherein the load controller (i) measures at least one grid parameter of a microgrid transmission line coupled to the load; (ii) computes, using the measured at least one grid parameter and a droop control technique that is also utilized by a generator that is part of the microgrid, at least one virtual generator set-point, wherein each virtual generator set-point of the at least one virtual generator set-point is a current set-point which indicates whether the generator would be commanded to increase or decrease at least one of its active or reactive currents in order to support grid stabilization; (iii) determines a modification to operation of the load based on the at least one virtual generator set-point; and (iv) modifies operation of the load based on the modification.

9. The apparatus of claim 8, wherein the load controller further compares the at least one virtual generator set-point to at least one threshold, and determines the modification based on the comparison.

10. The apparatus of claim 8, wherein the modification is determined based additionally on at least one load parameter pertaining to the load.

11. The apparatus of claim 10, wherein the at least one load parameter comprises one or more of present load operating state, amount of current drawn by the load, load criticality, a required operating range for the load, one or more thresholds for increasing current drawn by the load, and one or more thresholds for decreasing current drawn by the load.

12. The apparatus of claim 9, wherein the at least one virtual generator set-point comprises a virtual active current set-point.

13. The apparatus of claim 12, wherein the at least one threshold comprises an upper threshold and a lower threshold that form a hysteresis loop, and wherein (i) when the virtual active current set-point exceeds the upper threshold, the modification comprises controlling the load to reduce current drawn by the load.

14. The apparatus of claim 13, wherein (ii) when the virtual active current set-point is below the lower threshold, the modification comprises controlling the load to increase current drawn by the load.

15. A non-transitory computer readable medium containing computer instructions stored therein for causing a computer processor to perform a method for controlling a microgrid load, the method comprising:

computing, by a load controller that comprises the computer processor and is part of a load in a microgrid, using a droop control technique that is also utilized by a generator that is part of the microgrid and at least one grid parameter measured by the load controller on a transmission line coupled to the load, at least one virtual generator set-point, wherein each virtual generator set-point of the at least one virtual generator set-point is a current set-point which indicates whether the generator would be commanded to increase or decrease at least one of its active or reactive currents in order to support grid stabilization;

determining, by the load controller, a modification to operation of the load based on the at least one virtual generator set-point; and modifying, by the load controller, operation of the load based on the modification.

16. The non-transitory computer readable medium of claim 15, wherein the method further comprises comparing, by the load controller, the at least one virtual generator set-point to at least one threshold, and determining, by the load controller, the modification based on the comparison.

17. The non-transitory computer readable medium of claim 15, wherein the modification is determined based additionally on at least one load parameter pertaining to the load.

18. The non-transitory computer readable medium of claim 17, wherein the at least one load parameter comprises one or more of present load operating state, amount of current drawn by the load, load criticality, a required operating range for the load, one or more thresholds for increasing current drawn by the load, and one or more thresholds for decreasing current drawn by the load.

19. The non-transitory computer readable medium of claim 16, wherein the at least one virtual generator set-point comprises a virtual active current set-point.

20. The non-transitory computer readable medium of claim 19, wherein the at least one threshold comprises an upper threshold and a lower threshold that form a hysteresis loop, and wherein (i) when the virtual active current set-point exceeds the upper threshold, the modification comprises controlling the load to reduce current drawn by the load, and (ii) when the virtual active current set-point is below the lower threshold, the modification comprises controlling the load to increase current drawn by the load.

* * * * *